United States Patent [19]

Bonnema et al.

[11] 4,015,946
[45] Apr. 5, 1977

[54] PROCESS FOR RECOVERING AMMONIUM SULPHATE FROM AQUEOUS SOLUTIONS OF AMMONIUM SULPHATE WHICH CONTAIN ORGANIC COMPOUNDS

[75] Inventors: Jentje Bonnema, Beek; Henri J. H. Simon, Geleen, both of Netherlands

[73] Assignee: Stamicarbon N.V., Geleen, Netherlands

[22] Filed: July 12, 1971

[21] Appl. No.: 161,997

Related U.S. Application Data

[63] Continuation of Ser. No. 798,155, Feb. 10, 1969, abandoned.

[30] Foreign Application Priority Data

Feb. 8, 1968  Netherlands ............... 6801824

[52] U.S. Cl. ............................. 23/300; 23/302 A;
423/549; 260/465.3; 260/465.9; 260/486 NC
[51] Int. Cl.$^2$ ...................... B01D 9/02; C01C 1/24
[58] Field of Search ....... 423/545, 549, 550, 658.5;
260/465.3, 561 N, 465.9, 486; 23/299, 302, 300, 302 A

[56] References Cited

UNITED STATES PATENTS

| | | | |
|---|---|---|---|
| 2,331,235 | 10/1943 | Ruys et al. | 423/549 |
| 3,374,263 | 3/1968 | Weitz et al. | 260/465 |
| 3,468,624 | 9/1969 | Miller et al. | 423/545 |
| 3,489,512 | 1/1970 | Okuno et al. | 423/545 |
| 3,607,136 | 9/1971 | Smiley | 423/545 X |

FOREIGN PATENTS OR APPLICATIONS

| | | | |
|---|---|---|---|
| 8,529 | 4/1967 | Japan | 423/545 |
| 13,466 | 7/1964 | Japan | 423/545 |
| 6,516,059 | 6/1967 | Netherlands | 423/545 |

*Primary Examiner*—Stephen J. Emery
*Assistant Examiner*—S. J. Emery
*Attorney, Agent, or Firm*—Cushman, Darby & Cushman

[57] ABSTRACT

A process for recovering ammonium sulphate from an aqueous ammonium sulphate solution containing organic contaminants is disclosed. The aqueous solution is contacted with an organic substance which is water soluble and which is capable, in combination with a saturated ammonium sulphate solution, of forming a two-layer system. The organic substance is selected from the group consisting of lactames of 4 to 20 carbon atoms, and mixtures thereof. The resultant two layers may be separated into an aqueous phase containing the ammonium sulphate, and an organic phase containing the organic substance and the organic contaminants. Typical organic contaminants include acrylonitrile prepared from propylene, methyl methacrylate prepared from acetone cyandihydrin, and methyl methacrylate prepared from acrylonitrile. The ammonium sulphate is readily crystallized from the aqueous phase. Alternatively, the ammonium sulphate may be directly crystallized from the aqueous solution while the solution is in contact with the organic substance.

3 Claims, No Drawings

PROCESS FOR RECOVERING AMMONIUM SULPHATE FROM AQUEOUS SOLUTIONS OF AMMONIUM SULPHATE WHICH CONTAIN ORGANIC COMPOUNDS

CROSS-REFERENCE TO RELATED APPLICATIONS

This application is a continuation of our earlier application Ser. No. 798,155, filed Feb. 10, 1969 and now abandoned.

BACKGROUND OF THE INVENTION

This invention relates to a process for recovering ammonium sulphate from an aqueous solution contaminated with organic substances formed in the synthesis of organic compounds. The invention relates in particular to the recovery of ammonium sulphate formed in the preparation of acrylonitrile from propylene, of methyl methacrylate from acetone cyanohydrin, and of methyl acrylate from acrylonitrile.

The presence of contaminants consisting of primarily tarry and/or sulphur-containing organic substances, which are generally of little value and are considered as waste matter, causes difficulties and increased costs in working-up ammonium sulphate solutions which are formed in the preparation of organic compounds. Avoiding additional costs by simply discharging these solutions as waste water is generally not feasible in view of the resulting water pollution, and the recovery of pure ammonium sulphate by crystallization is impeded by the presence of the organic substances; impure products will be obtained and the costs of the purification will usually exceed the value of the ammonium sulphate obtained.

It has been previously proposed to recover ammonium sulphate from an aqueous solution containing solid organic components by a process in which water is evaporated from the said solution and an organic phase of the contaminants is formed and removed, after which ammonium sulphate is recovered from the remaining aqueous solution by crystallization. This process for purifying ammonium sulphate solutions can only be applied if the required phase separation between the ammonium sulphate solution and the contaminants takes place as a result of the evaporation of water from the solution. An example of the application of this prior process is the working-up of the ammonium sulphate solution left over in the preparation of caprolactam.

The above prior art process is not, however, applicable to other ammonium sulphate solutions, such as the solution formed in the preparation of acrylonitrile by the oxidation of gaseous propylene in the presence of ammonia. The oxidation off gas, which contains an excess of ammonia, is treated with sulphuric acid, in which treatment a waste flow is formed of ammonium sulphate, which is contaminated with organic components, in particularly with tarry impurities. Similar contaminants are contained in the ammonium sulphate solutions formed in the preparation of methyl methacrylate from acetone cyanohydrin, methanol and sulphuric acid, or of methyl acrylate from acrylonitrile, methanol and sulphuric acid. Treatment of these solutions with common solvents, such as acetone, benzene, ethyl alcohol, carbon tetrachloride, dichloroethane, cyclohexane, cyclohexanone, methyl isobutyl ketone, etc., is not effective because such solvents leave the organic contaminants wholly or partly undissolved.

DETAILED DESCRIPTION OF THE INVENTION

The present invention relates to a simple process for recovering ammonium sulphate from an aqueous solution containing tarry and/or sulphur-containing, organic components. According to the invention, one or more organic substances which are soluble in water and are capable, in combination with a saturated ammonium sulphate solution, of forming a two-layer system, are added to the solution, wherein the organic substance is selected from the group consisting of lactams of 4 to 20 carbon atoms, such as caprolactam, piperidone or pyrrolidone. By preference, use is made of caprolactam, as it is relatively involatile at elevated temperatures and can be easily recovered in the pure state by extraction with benzene. Mixtures of the organic substances may be used.

In one embodiment of the present process, the ammonium sulphate solution is subjected to an extraction with an aqueous solution of one or more organic substances that can be dissolved in water and are capable, in combination with a saturated ammonium sulphate solution, of forming a two-layer system. In such an extraction, the organic contaminants in the ammonium sulphate solution are transferred to the phase containing the dissolved organic substance, such as, for instance, a caprolactam solution. In case the ammonium sulphate solution is insufficiently concentrated to form a two-layer system with the dissolved organic substance, the concentration of the ammonium sulphate solution may first be raised to a sufficiently high level, e.g. by evaporation preferably in a somewhat acid medium. The two-layer system or two phases, formed upon the addition of the aforesaid organic substance, is readily separated into its two respective phases by conventional methods, e.g., decantation.

In the embodiment of the present process, the ammonium sulphate solution preferably contains at least 30% by weight of ammonium sulphate, but the ammonium sulphate concentration may vary between 30% by weight and a saturated solution. The amount of water soluble organic substance added to the ammonium sulphate solution may vary from 20 to 200% by weight or more, with respect to the weight of ammonium sulphate. Preferably, the amount of water soluble organic substance is within the range of 25 to 100% by weight, based on the weight of ammonium sulphate.

The present process may also be effected by crystallizing the ammonium sulphate in the solution in the presence of one or more of the above-mentioned organic substances, instead of subjecting the solution to the above extraction treatment. During the crystallization, the organic contaminants are transferred to the phase containing the organic substance. The ammonium sulphate is generally crystallized from the aqueous phase under somewhat acid conditions, preferably at a pH of 2 to 6.

The amount of water-soluble organic substance to be added depends on the process particular conditions. For instance, in the case of a 30% by weight ammonium sulphate solution, 50% by weight of caprolactam, preferably in the form of a 75% aqueous solution, is added with respect to the weight of the ammonium sulphate.

The crystallization of the ammonium sulphate from an aqueous phase after separation of the organic phase, or from an aqueous solution in contact with the above-described organic substance, may be accomplished by any conventional method. Any of the crystallization conditions and processes described in *Chemical Engineers' Handbook*, Textbook Edition, Third Edition, pgs. 1050–1072, McGraw-Hill, New York, 1950, the disclosure of which is hereby incorporated by reference, may be used to crystallize the ammonium sulphate in the practice of the present invention.

The present invention is not limited to removing organic contaminants from ammonium sulphate solutions formed in the preparation of acrylonitrile, methylacrylate or methylmethacrylate but may, in general, be applied to nitriles of 2 to 10 carbon atoms in length or acrylates and methacrylates with alkylgroups with 1 to 5 carbon atoms aqueous solutions of ammonium sulphate contaminated with organic components. The present process is of special importance, however, for working up the aqueous solutions of ammonium sulphate obtained in the preparation of acrylonitrile by oxydation of gaseous propylene in the presence of ammonia, in which preparation the reaction product is treated with sulphuric acid and subsequently separated from the resulting ammonium sulphate solution.

An incidental, but important advantage of the invention is that the ammonium sulphate solution obtained from the acrylonitrile process can be mixed with one or more ammonium sulphate solutions obtained in the preparation of caprolactam, in which case the amount of additional caprolactam which must be added is smaller, owing to the presence of small amounts of caprolactam in the latter solutions.

The organic substances added can, by extraction with an organic solvent, be separated from the contaminants, which are left in the waste water. After the extracting organic solvent has been distilled off, the organic substances can be re-used.

When the caprolactam has been removed from the organic layer by extraction, e.g. with benzene, a concentrated aqueous solution of the organic contaminent is left over. This mixture may be burnt; it may, however, also be used for dissolving the tar in the recovery of the lactam from the organic layer.

The invention will be elucidated by means of the following examples.

EXAMPLE I 1000 grammes of an aqueous solution containing 290 grammes of ammonium sulphate and 90 grammes of organic contaminants formed in the preparation of acrylonitrile were subjected to an extraction with a solution of 150 grammes of caprolactam in 50 grammes of water. In the extraction, the organic contaminants were dissolved in the caprolactam phase. The two phases were readily separated by decantation. 250 grammes of pure ammonium sulphate were recovered from the remaining ammonium sulphate solution by crystallization. The mother liquor was subjected to a second extraction with caprolactam solution, in which treatment the ammonium sulphate residue was recovered, after crystallization by evaporation in the pure state.

The caprolactam solution was separated from the organic contaminants by extraction with 1000 grammes of benzene, with the organic contaminants being left in the water. The caprolactam was recovered and re-used after the benzene had been distilled off.

EXAMPLE II

A solution of 150 grammes of caprolactam in 50 grammes of water was added to 5000 grammes of an aqueous solution containing 290 grammes of ammonium sulphate and 90 grammes of organic contaminants formed in the preparation of acrylonitrile. After evaporation of the resulting solution to 1200 grammes, the caprolactam layer was separated off. From the remaining ammonium sulphate layer, 250 grammes of pure ammonium sulphate were recovered after crystallization by evaporation. The mother liquor was once again treated with caprolactam, in which treatment additional ammonium sulphate was recovered in the pure state.

A solution of 16 grammes NaOH in 48 grammes of water was added to the contaminated caprolactam solution, after which the resulting solution was subjected to an extraction with 1000 grammes of benzene. In this treatment, the organic contaminants were left in the water. The caprolactam was re-used after the benzene had been distilled off.

EXAMPLE III 2000 grammes of an aqueous solution from a caprolactam process, containing 72 grammes of ammonium sulphate and 86 grammes of organic contaminants in the form of amino acids were added to 4000 grammes of another aqueous solution containing 219 grammes of ammonium sulphate and 90 grammes of organic contaminants formed in the preparation of acrylonitrile. After the resulting solution had been evaporated evaporation to 1000 grammes, it was subjected to an extraction with a solution of 150 grammes of caprolactam in 50 grammes of water. In the said treatment, the organic contaminants were dissolved in the caprolactam solution. 250 grammes of pure ammonium sulphate were recovered from the remaining ammonium sulphate solution by crystallization. The mother liquor was again subjected to an extraction with caprolactam solution, in which treatment the ammonium sulphate residue was recovered in the pure state. The caprolactam solution was extracted with 1000 grammes of benzene to separate the caprolactam from the organic contaminants, which were left in the water. The caprolactam was re-used after the benzene had been distilled off.

EXAMPLE IV 1 liter per hour of hot waste water from an acrylonitrile process, which contained 200 grammes of ammonium sulphate and about 15 grammes of organic compounds, was subjected to continuously operating crystallization by cooling and seeding. Caprolactam was also fed to the said crystallizer at the rate of 15 g/h. The resulting ammonium sulphate crystal slurry was centrifuged and washed with water. The mother liquor and the washing liquid were fed back to the crystallizer. The hourly yield of pure ammonium sulphate crystals amounted to 200 grammes. The caprolactam formed an organic layer in combination with the organic contaminants present in the crystallizer. The organic layer was drained via a separator. The lactam was recovered from the organic layer by extraction with benzene, during which treatment a tar precipitated, and then the lactam was separated from the benzene by distilling off the latter.

EXAMPLE V

Hot waste water from a methyl methacrylate process, wherein methyl methacrylate was prepared from acetone cyanohydrin with the aid of sulphuric acid and methanol, was subjected to continuously operating crystallization by cooling and seeding at the rate of 1 liter per hour. One liter of the waste water contained 200 grammes of ammonium sulphate and 25 grammes of generally tarry organic compounds. Caprolactam was also fed to the said crystallizer, at the rate of 15 g/h. The crystallization was effected in an acid medium (pH). The ammonium sulphate crystal slurry was centrifuged and washed with water, and the mother liquor and the washing liquid were fed back to the crystallizer. The yield of pure ammonium sulphate crystals amounted to 200 grammes per hour. In combination with the organic contaminants present in the crystallizer, the caprolactam formed an organic layer, which was drained via a separator. The caprolactam was recovered in a manner similar to Example VI.

EXAMPLE VI

Similar results are obtained as in Example VI if the aqueous solution of ammonium sulphate is obtained from the precipitation of methylacrylate from acrylonitrile, methanol and sulphuric acid.

We claim:

1. In a process for recovering purified ammonium sulphate from a contaminated aqueous ammonium sulfate solution containing at least 30 percent by weight ammonium sulfate and organic impurities soluble in a water-soluble organic substance, said aqueous solution obtained from the synthesis of acrylonitrile prepared by oxidation of gaseous propylene in the presence of ammonia, wherein the reaction product is treated with sulfuric acid and then separated from the resulting ammonium sulfate solution;

the synthesis of methyl methacrylate prepared from acetone cyanohydrin, methanol, and sulfuric acid; or the synthesis of methyl acrylate prepared from acrylonitrile, methanol, and sulfuric acid, the improvement which comprises intimately contacting said aqueous solution of ammonium sulfate containing said organic impurities with an organic substance selected from the group consisting of lactams of 4 to 20 carbon atoms and mixtures thereof, said organic substance being present in an amount sufficient to form an organic phase and an aqueous phase during crystallization, crystallizing said aqueous solution containing ammonium sulfate, organic contaminants, and lactams of 4 to 20 carbon atoms by evaporation, whereby a two-phase liquid system containing a substantially saturated aqueous ammonium sulfate-containing phase and a lactam-containing phase and solid ammonium sulfate crystals are formed, maintaining said phases in a liquid state so as to extract said organic impurities from the aqueous phase by means of the organic substance and separating the phases.

2. A process for recovering purified ammonium sulfate from an aqueous solution containing at least 30% by weight ammonium sulfate and organic contaminants, said aqueous solution obtained from the synthesis of acrylonitrile prepared by oxidation of gaseous propylene in the presence of ammonia, wherein the reaction product is treated with sulfuric acid and then separated from the resulting ammonium sulfate solution;

the synthesis of methyl methacrylate prepared from acetone cyanohydrin, methanol, and sulfuric acid; or the synthesis of methyl acrylate prepared from acrylonitrile, methanol, and sulfuric acid, comprising:

adding caprolactam or an aqueous caprolactam containing liquid to said aqueous solution containing ammonium sulfate and organic contaminants, crystallizing said aqueous solution containing ammonium sulfate, organic contaminants, and caprolactam or caprolactam containing liquid by evaporation, whereby a two-phase liquid system containing a substantially saturated aqueous ammonium sulfate-containing phase and a caprolactam-containing phase and solid ammonium sulfate crystals are formed, transferring said organic contaminants to said caprolactam-containing phase, separating said solid ammonium sulfate from said substantially saturated aqueous ammonium sulfate-containing phase, and separating said substantially saturated aqueous ammonium sulfate-containing phase and said caprolactam-containing phase.

3. The process as claimed in claim 2, wherein the starting aqueous ammonium sulphate-containing solution is mixed with at least one additional aqueous ammonium sulphate-containing solution obtained in the preparation of caprolactam, whereby the amount of said caprolactam or aqueous caprolactam-containing liquid which must be added is reduced.

* * * * *